J. TRUNNEL.
SAW FILING AND SAW SETTING MACHINE.
APPLICATION FILED MAR. 30, 1907.
945,482.
Patented Jan. 4, 1910.
2 SHEETS—SHEET 2.
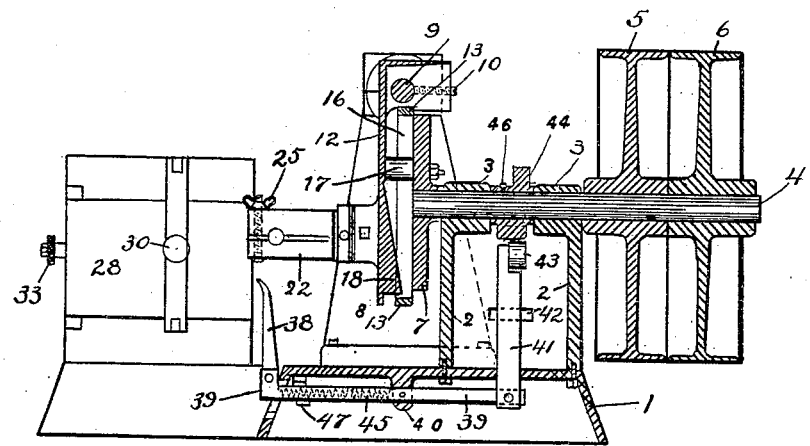
Fig. 3.
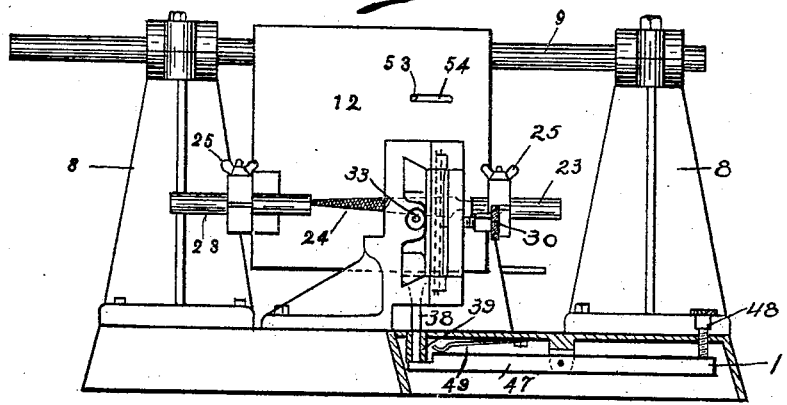
Fig. 4.
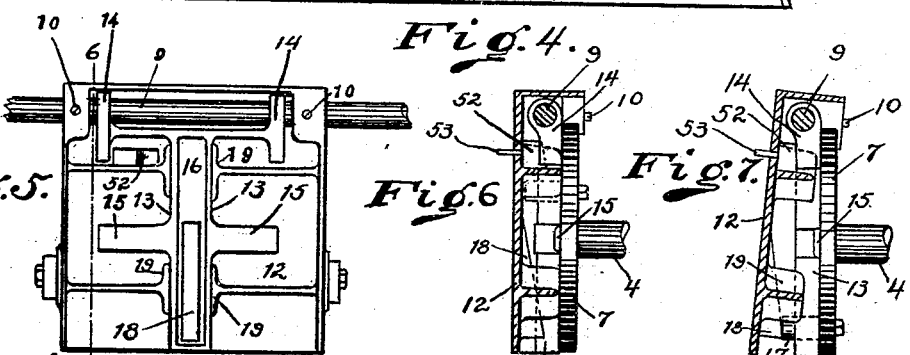
Fig. 5.   Fig. 6.   Fig. 7.
Witnesses
C. M. Palmestek
Glena Pritchard
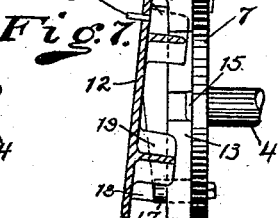
Inventor
James Trunnel
by Alfred M Allen
Attorney

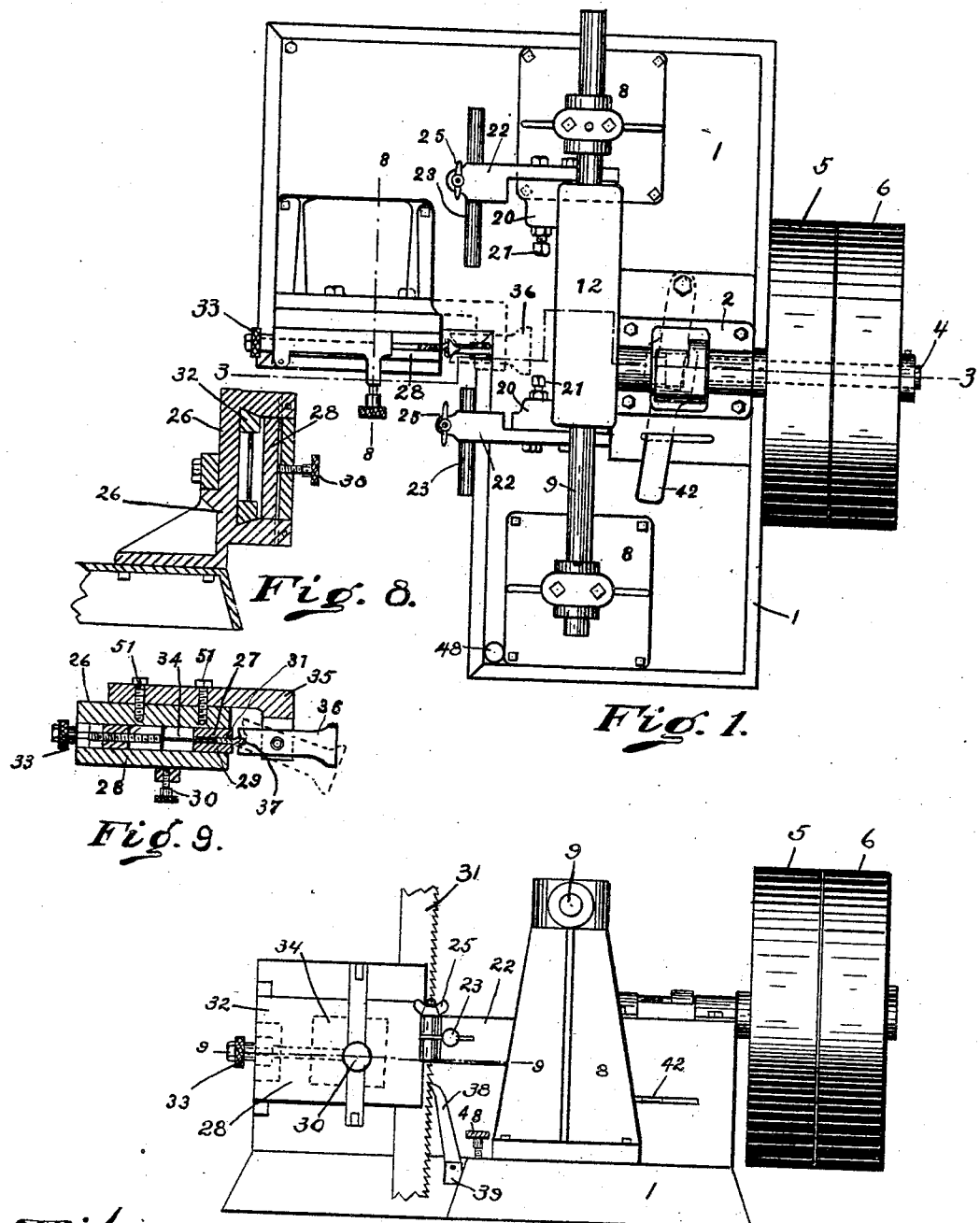

UNITED STATES PATENT OFFICE.

JAMES TRUNNEL, OF CINCINNATI, OHIO.

SAW-FILING AND SAW-SETTING MACHINE.

945,482.  Specification of Letters Patent.  Patented Jan. 4, 1910.

Application filed March 30, 1907. Serial No. 365,607.

*To all whom it may concern:*

Be it known that I, JAMES TRUNNEL, a citizen of the United States, residing in Cincinnati, county of Hamilton, and State of Ohio, have invented a certain new and useful Saw-Filing and Saw-Setting Machine, of which the following is a full, clear, and exact description, reference being had to the accompanying drawings, forming part of this specification.

The purpose of my invention is to provide a machine for sharpening and setting the teeth of band saws, and the like, in which the mechanism provided for feeding the saw to the file, and for automatically operating the file can be adjusted at a moment's notice for automatically setting the saw teeth, and feeding the saw thereto.

The invention consists of that certain novel construction and arrangement of parts to be hereinafter particularly pointed out and claimed.

In the drawings Figure 1 is a plan view of my machine. Fig. 2 is a side elevation of same. Fig. 3 is a cross section taken on the lines 3—3 of Fig. 1. Fig. 4 is a front elevation of the machine. Fig. 5 is a rear view of the plate which carries the file holder and the saw setting actuating devices. Fig. 6 is a vertical section of same taken on the lines 6—6 of Fig. 5. Fig. 7 is a similar section with the plate carrier in its outer position. Fig. 8 is a detail sectional view taken on the lines 8—8 of Fig. 1. Fig. 9 is a detail sectional view taken on the lines 9—9 of Fig. 2.

1 is the base plate upon which is mounted the standard 2, provided with journal bearings 3—3, in which is journaled the driving shaft 4, provided on its outer end with the loose pulley 5, and the tight pulley 6, and carrying on its inner end the disk 7. 8—8 are other standards secured on the base plate at each side, and in the upper end of these standards is mounted the shaft 9 arranged to rock in the bearings, and also to slide laterally therein. Secured on the middle portion of this shaft 9 between the two standards by the set screw 10—10— is a flanged plate 12, and loosely mounted on the shaft 9 within this flanged plate is the guide plate 13, the guide plate being provided with perforated lugs or ears 14, through which the shaft 9 passes. This guide plate has flat lateral arms 15—15, which bear against the face of the disk 7, and the guide plate is provided with a vertical slot 16, through which slot the stud 17 secured to the disk 7 passes. This stud bears against the inner face of the plate 12, and the plate 12 is provided with a raised portion 18, which extends into the slot in the guide plate 13, as shown in Fig. 3. The guide plate is held in alinement, and in connection with the plate 12, by the guide surfaces 19—19.

It will be evident from this construction that as the driving shaft 4 is rotated by a suitable belt running over the pulley 6 the disk 7 will be rotated, and with it the stud or crank pin 17, and that the rotation of the disk will carry the guide plate and plate 12, and shaft 9, back and forth between the supporting standards 8, and it will also be evident that during half of each revolution of the disk 7 the stud 17 will ride on the beveled surface 18 of the plate, and swing the lower end of said plate outward as indicated in Fig. 7, the plate dropping back to its vertical position during the other half rotation of the disk 7. We will, therefore, have two movements of the plate 12, a reciprocating movement back and forth between the standards 8, and the swinging movement of its lower end outward. Securely bolted to the front face of the plate 12 at its side edges are the lugs 20—20, which carry on their inner side faces the adjustable bolts 21—21. Bolted to lugs 20, and extending forward are the two holders 22—22, which are split horizontally at their outer ends and carry the file holders 23—23, adjustable toward each other to hold the file 24, the file holders being clamped in position by the thumb screws 25—25.

For holding and feeding the band saw to be filed, and the teeth of which are to be set, I provide as follows. 26 is a frame casting bolted to the base plate, and provided with a vertical bar 27, secured to the side face of the casting along its inner edge. 28 is a plate provided with a similar vertical bar 29, secured along the inside edge of the plate 28, the two bars 27 and 29, forming between them a vertical slot to hold and guide the saw 31, which is fed vertically as will be hereinafter described. The plate 28, with its bar 29, is held in proper adjustment by the set screw 30, to maintain the guiding slot, but not to clamp the saw tightly. 32 is a dove-tailed vertical plate sliding in the holder 26, and adjustable toward or away from the back edge of the saw 31 by the thumb screw 33. This plate 32 is cut away, and a thin plate 34 is inserted in the cut away portion, and this thin plate 34 bears against the back edge of the saw, so that the position of the saw may be adjusted for the action of the file, and tooth setting device. This tooth setting device consists of a holder 35 carrying a lateral arm, upon which is pivoted the hammer 36. The tooth setting end of this hammer is provided with a groove 37, within which the saw teeth extend, and as the hammer is shifted from side to side by contact with the bolts 21 on the plate 12, as will be hereinafter described, the operating end of the hammer comes in contact with the teeth on each side, and gives them the proper bend for the purpose required.

For feeding the saw, I provide a spring pressed pawl 38, which is pivoted near its lower end on one end of the lever 39, its upper end engaging the teeth of the saw, 45 being a spring attached between the lower end of the pawl, and the lever, to hold the pawl in spring engagement with the teeth of the saw. This lever 39 is pivoted near its middle point to a lug 40, depending from the base plate, and the lever carries at its other end a vertical arm 41 pivoted thereon, and passing up through a horizontal adjusting lever 42, pivoted to the frame, so that by shifting the lever 42 the upper end of the arm 41 which carries the roller 43 can be shifted laterally. 44 is a double cam mounted on the shaft 4. This cam is about twice the width of the roller 43, and on one side is cut away at 46, so that the cam will not touch the roller on this side when the arm 41 and the roller is shifted into the position of the adjusting lever 42, shown in Fig. 1. It follows from this construction that when the vertical arm 41 is in the position shown in Fig. 3, the double cam will come in contact with the roller at each half revolution of the shaft 4, so that when in this position the lever 39 and the pawl 38 will be raised twice for every revolution of the shaft. When the arm 41 has been shifted into the position of the shifting lever 42, as shown in Fig. 1, then the cam will only strike the roller once for each revolution of the shaft, and the pawl 38 will only be actuated once for each of such revolutions.

In order to adjust the throw of the pawl 38 for different sized teeth, a lever 47 is pivoted at its central point on a suitable lug underneath the base plate, the outer end of this lever passing under and secured to the lever 39, as shown in Fig. 4. The distance that the lever 39 can descend is adjusted by raising or lowering the inner end of the lever 47 by the set screw 48. 49 is a spring which bears on this end of the lever 47 to return same, and the lever 39, to its normal position ready for the pawl 38 to engage the next tooth.

The operation of the machine is as follows: The band saw 31 is suspended above, and one edge is secured and properly adjusted between the bearing surfaces 27 and 29, and a file 24 is secured in the file holder 23—23. By adjusting the screw 33,—the teeth of the saw are adjusted into such a vertical position that the file, when the file holder and its carrying plate 12 is swung forward into the position shown in Fig. 7, will come into proper position to file the saw teeth. It will be understood that when the saw is to be filed, the holder 35, with its hammer 36 for setting the saw teeth, is removed. In filing the teeth, the file is arranged to cut only on one lateral movement of the plate 12, and during the return movement of the plate 12 the plate swings back to its vertical position as shown in Fig. 3. This swinging movement or advance of the file into the saw teeth and away from the saw teeth is brought about by the movement of the stud 17 against the raised surface of the plate 12, and at the same time the file is drawn against the lower edge of the tooth to sharpen same by the lateral movement of the plate 12 as it is actuated by the stud 17 riding in the slot 16 in the guiding plate 13. As the file is intended to file the tooth only on one lateral movement of the plate 12, and as the plate 12 completes its forward and back movement with each revolution of the shaft 4, the saw teeth or the saw is fed forward, or upward, one tooth only with each entire revolution of the shaft 4. When filing the saw teeth, therefore, the lever 42 is thrown over into the position shown in Fig. 1, which brings the roller and upper end of the arm 41, which actuates the pawl 38, under the single cam surface on the shaft 4, and the feeding pawl 38 is only actuated once for each revolution of the shaft. When it is desired to set the saw teeth, the setting device 35 is secured in place by the screw bolts 51—51 on the casting 26, and the groove 37, in the hammer 36 brought to embrace the saw teeth. When the saw setting device is in use, the plate 12 is held permanently in its advance position, as shown in Fig. 7 by a beveled nut, or wedge block, 52, operated by the pin 53 passing out through the slot 54 in the plate 12, so that this nut can be brought in between the plate 12 and the guiding plate 13. In this position the bolt heads 21—21 will come into contact with the outer end of the hammer 36, one on each side with each lateral movement in either direction of the plate 12, and the amount of the throw of the hammer 36 is regulated by adjusting the bolts 21—21. In this use of the machine for setting the teeth as the contact of the hammer is made with each lateral movement of the plate 12, it is necessary for the saw teeth to be fed forward or upward with each half rotation of the shaft 4, so that when the teeth are being set, the actuating arm 41 is shifted by the lever 42, so that the cam 44 will come in contact with the roller 43 at each half rotation of the shaft 4.

It will be understood from the above described operation, that when the band saw has been properly adjusted in position in the holding clamps, and the throw of the pawl 38 has been regulated by adjusting the screw 48, the band saw will be rapidly fed around, and each tooth accurately filed the proper amount, and all automatically. In the same way when the saw setting device has been adjusted in place, each tooth will be accurately turned or set the exact amount required, each succeeding tooth in opposite direction from the preceding one, and all automatically.

Having thus described my invention, what I claim as new, and desire to secure by Letters Patent, is:—

1. In a machine of the character specified, a file holder, an oscillating plate to which the same is secured, said plate being movable in the direction of its axis of oscillation, a crank shaft, a crank carried thereby adapted to engage said plate, and a projection on the plate adapted to engage the end of said crank in the path of its movement to advance the file holder into the pathway of the saw teeth.

2. In a machine of the character specified, a file holder, an oscillating plate to which the same is secured, said plate being movable in the direction of its axis of oscillation, a crank shaft, a crank carried thereby adapted to engage said plate, and a projection on the plate adapted to engage the end of said crank in the path of its movement, a cam on the crank shaft, a pawl to engage the saw teeth, and connecting levers intermediate the pawl and cam to shift the saw after each engagement of the file therewith.

3. In a machine of the character specified, a file holder, an oscillating plate to which the same is secured, a non-oscillating vertically slotted actuating plate for the file holder plate, movable with said plate in the direction of the axis of oscillation thereof, a crank shaft, a crank carried thereby engaging the slot in the actuating plate with a projection on the oscillating plate extending into said slot engaged by the crank in the path of its movement.

4. In a machine of the character specified, a file holder, an oscillating plate to which the same is secured, a non-oscillating vertically slotted actuating plate for the file holder plate, movable with said plate in the direction of the axis of oscillation thereof, a crank shaft, a crank carried thereby engaging the slot in the actuating plate with a projection on the oscillating plate extending into said slot engaged by the crank in the path of its movement, a cam on said crank shaft and a pawl to engage the saw teeth, with connecting levers intermediate the pawl and cam to shift the saw after each engagement of the file therewith.

JAMES TRUNNEL.

Witnesses:
Louis Enslm,
Alfred M. Allen.